United States Patent
Wolters et al.

(10) Patent No.: US 6,359,907 B1
(45) Date of Patent: Mar. 19, 2002

(54) METHOD TO PROVIDE INFORMATION CONCERNING A FREQUENCY BAND, A HEAD-END AND A TERMINAL REALIZING SUCH A METHOD AND A COMMUNICATION ACCESS NETWORK INCLUDING SUCH A HEAD-END AND SUCH A TERMINAL

(75) Inventors: Robert Peter Christina Wolters, Montfort (NL); Harry Franciscus Ludovica Vanhoof, Lille (BE)

(73) Assignee: Alcatel (FR)

( * ) Notice: Subject to any disclaimer, the term of this patent is extended or adjusted under 35 U.S.C. 154(b) by 0 days.

(21) Appl. No.: 09/111,982

(22) Filed: Jul. 8, 1998

(30) Foreign Application Priority Data

Jul. 10, 1997 (EP) .............................................. 97401707

(51) Int. Cl.[7] .................................................. H04J 1/00
(52) U.S. Cl. ...................................... 370/485; 370/497
(58) Field of Search ................................ 370/432, 436, 370/442, 447, 449, 450, 451, 452, 453, 457, 458, 459, 460, 461, 462, 463, 480, 485, 489, 490, 496, 497, 498, 522

(56) References Cited

U.S. PATENT DOCUMENTS

| | | | | |
|---|---|---|---|---|
| 4,924,457 A | * | 5/1990 | Shimizu ...................... | 370/346 |
| 5,677,909 A | * | 10/1997 | Heide .......................... | 370/347 |
| 6,006,017 A | * | 12/1999 | Joshi et al. ............ | 395/200.11 |
| 6,075,787 A | * | 6/2000 | Bobeck et al. ............... | 370/395 |

FOREIGN PATENT DOCUMENTS

| | | |
|---|---|---|
| EP | 0691759 | 1/1996 |
| EP | 0750424 | 12/1996 |
| WO | 9641452 | 12/1996 |

OTHER PUBLICATIONS

"Low Cost Implementation of a Control Channel for Multi–Channel Networks" IBM Technical Disclosure Bulletin, vol. 36, No. 4, Apr. 1, 1993, pp. 149–150.

IEEE802.14–95/156, published in Nov. 6, 1995, Protocol Stack and Topology Assumptions for Medium Access Controller (MAC) Level Access Protocol (MLLP) and Medium Access Controller (MAC) Level Access.

* cited by examiner

*Primary Examiner*—Kwang B. Yao
(74) *Attorney, Agent, or Firm*—Ware, Fressola, Van Der Sluys & Adolphson LLP (57) ABSTRACT

A method for use by a terminal (or a set of terminals all communicating via for example time division multiple access) of a communication access network seeking to communicate with the head end of the network, the head end for communicating with many terminals in a signal comprising many different frequencies, one frequency for each of many corresponding transceivers of the network, where the communication between the terminal and the head end is via communication between the terminal and a particular transceiver, and the method is used to establish a correspondence between the terminal and the particular transceiver. The method involves exchanging initialization packets between the head end and the terminal seeking to communicate with the head end, initialization packets that convey to the terminal the frequency to use to communicate with the particular transceiver, and that communicate to the particular transceiver the identity of the terminal. A head end and a terminal operating according to the method are also provided, as is a communication access network.

10 Claims, 1 Drawing Sheet

METHOD TO PROVIDE INFORMATION CONCERNING A FREQUENCY BAND, A HEAD-END AND A TERMINAL REALIZING SUCH A METHOD AND A COMMUNICATION ACCESS NETWORK INCLUDING SUCH A HEAD-END AND SUCH A TERMINAL

TECHNICAL FIELD

The present invention relates to a method to provide information in a communications access network that includes a plurality of terminals and a head-end having a plurality of transceivers and further being coupled to each one of the terminals via a downstream common link and a tree-like distributive network. It is also directed to a head-end to provide information and a terminal to receive information realizing such a method, and a communication access network including such a terminal and such a head-end.

BACKGROUND OF THE INVENTION

Such a communication access network including such a terminal and such a head-end is already known in the art, e.g. from the submission of "IEEE802.14-95/156, published in Nov. 6, 1995, Protocol Stack and Topology Assumptions for Medium Access Controller (MAC) Level Management Protocol (MLMP) and Medium Access Controller (MAC) Level Access Protocol (MLAP)". This submission is provided by the IEEE Project 802.14 Working Group/Standard Protocol for Cable-TV Based Broadband Communication Network. Therein a few topology's of multiple communication access networks are introduced, more particular on pages 11, 13 and 15.

In order to indicate the background art which can be regarded as useful for understanding the invention, a description is given of the necessary features of the topology of such a communication access network wherein the invention is used.

Such a communication access network includes a head-end and a plurality of terminals. The head-end and each one of the plurality of terminals are communicating with each other by transmitting downstream and upstream information to each other.

In the downstream direction, the head-end is coupled to the plurality of terminals via a downstream common link and a tree-like distributive network. The head-end includes a plurality of transceivers. Each transceiver receives information from the network which is coupled to this communication access network. Such kind of network is e.g. an asynchronous transfer mode network or a synchronous digital hierarchical network and provides information of e.g. a multimedia server or from a router to an internet provider or information from an other access network. It has to be remarked that the kind of network coupled to a communication access network wherein the invention is used and the kind of information provided by the network coupled to the communication access network of the invention are both no restriction to the invention as such. The aim is that each transceiver included in the head-end receives information. The information received by one of the transceivers is modulated to a predefined frequency band and provided by this transceiver in this predefined frequency band to a combiner. The predefined frequency band is associated to this transceiver. In this way the combiner receives a plurality of downstream signals, each one being provided in a different frequency band. The combiner combines all the downstream signals together into one downstream modulated signal. This downstream modulated signal is broadcasted from the head-end to the plurality of terminals.

In the upstream direction each terminal is coupled to one of the plurality of transceivers included in the head-end via an upstream link. This means that each transceiver has its upstream link and that each terminal has access to the head-end via one of these links.

It has to be remarked that a plurality of terminals might have access to one and the same transceiver via one and the same upstream link whereby e.g. in a network terminator a multiple access system e.g. time division multiple access or frequency division multiple access, is used to give access to this upstream link for each one of the plurality of terminals. However, it will be obvious to a person skilled in the art that this feature is not a necessary feature and that this feature gives no restriction on the scope of the invention.

Since a terminal included in a communication access network as described above is only able to transmit information to the transceiver whereto this terminal is upstream coupled, this terminal needs to known which downstream frequency band belongs to its transceiver in order to be able to filter out of the modulated downstream signal a regenerated downstream signal with this downstream frequency band and to have a proper communication with its transceiver. Indeed, without prior knowledge of the configuration of the transceivers i.e. the assignment of the frequency bands to the transceivers, a situation can occur in which a terminal will react on a downstream signal included in the downstream modulated signal coming from another transceiver than the one that is receiving the upstream information of the terminal. Such a situation can cause an interruption or interference of other transmissions being performed by another terminal connected to another transceiver. Such situations should be prevented. By using the preassigned frequency band of its transceiver to filter out of the received modulated downstream signal a regenerated downstream signal which is associated to the downstream signal provided by its transceiver, the terminal is enabled to communicate with its transceiver in a proper way.

An obvious way to give this knowledge to a terminal of an end-user who likes to establish a communication and to have access to the communication access network is to tune the filter of the terminal to the frequency band according to information given to the end-user by e.g. an operator of the communication access network at e.g. installation time of the terminal.

However, a problem outstanding with this method to provide information concerning a filter frequency band is that each terminal has a different installation configuration according to its transceiver whereto the terminal is upstream coupled. In the event when e.g. an end-user moves with his terminal to another place which is located in an environment of an upstream link coupled to another transceiver his terminal has to be reconfigured according to new information to be given by the operator. Moreover, when such a communication access network needs to be reconfigured due to e.g. an increasing number of terminals coupled to the communication access network, new different frequency bands have to be given to the end-users and each terminal needs to be reconfigured on a different new frequency band.

SUMMARY OF THE INVENTION

An object of the present invention is to provide a method to provide information concerning a filter frequency band to be used by a terminal e.g. a first terminal, such as the above known method but which has not the above drawback of a different installation configuration for each terminal.

According to the present invention, this object is achieved by a method for use in a communication access network, the communication access network including a plurality of terminals and a head-end which includes a plurality of transceivers, said head-end being downstream coupled to each one of the plurality of terminals via a downstream common link and a tree-like distributive network, each one of the plurality of transceivers providing one of a plurality of downstream signals, in one of a plurality of frequency bands associated to the one of the plurality of transceivers to a combiner included in the head-end, the plurality of downstream signals being together combined into a downstream modulated signal, the downstream modulated signal being broadcasted from the head-end to the plurality of terminals, a first one of the plurality of terminals being upstream coupled to a first one of the plurality of transceivers via an upstream link, the aim of the method being to provide information to the first terminal, the information concerning a filter frequency band being a first one of the plurality of frequency bands and being intended to be used by the first terminal to filter out of the downstream modulated signal a first regenerated downstream signal associated to a first one of the downstream signals provided by the first transceiver, and wherein the method includes the steps of: at predefined time moments distributing by the head-end initialization packets, each one of the initialization packets including a distinct reference and being associated to a respective one of the plurality of transceivers and being included in one of the plurality of downstream signals provided by the one transceiver; the first terminal, upon receiving the downstream modulated signal, filtering out of the downstream modulated signal with one of the plurality of frequency bands a regenerated downstream signal; the first terminal, upon receiving one of the initialization packets included in the regenerated downstream signal, upstream transmitting a confirmation signal which includes the reference of the one initialization packet and an identification of the first terminal; and the head-end, upon receiving the confirmation signal by the first transceiver and in the event that the transceiver associated to the reference does not correspond to the first transceiver, distributing a change request by including the change request in the downstream signal provided by the transceiver associated to the reference, the change request including the identification of the first terminal and the first frequency band associated to the first transceiver (TRX1).

This object is also achieved by a head-end for inclusion in a communication access network and adapted to provide information, the head-end including a plurality of transceivers and being downstream coupled to each one of a plurality of terminals included in the communication access network via a downstream common link and a tree-like distributive network, each one of the plurality of transceivers being adapted to provide one of a plurality of downstream signals in one of a plurality of frequency bands associated to the one of the plurality of transceivers to a combiner included in the head-end, the combiner being adapted to combine the plurality of downstream signals together into a downstream modulated signal which is broadcasted from the head-end to the plurality of terminals, a first one of the plurality of terminals being coupled to a first one of the plurality of transceivers via an upstream link, the information being provided to the first terminal and concerning a filter frequency band being a first one of the plurality of frequency bands and being intended to be used by the first terminal to filter out of the downstream modulated signal a first regenerated downstream signal being associated to a first one of the downstream signals provided by the first transceiver, wherein the head-end further includes: first inserting means to include at predefined time moments initialization packets, each one of the initialization packets including a distinct reference and being associated to a respective one of the plurality of transceivers and is included in one of the plurality of downstream signals provided by the one transceiver, the first inserting means enables thereby the first terminal to receive one of the initialization packets included in a regenerated downstream signal which is filtered out of the downstream modulated signal received by the first terminal with one of the plurality of frequency bands and to transmit an upstream confirmation signal which includes the reference of the one initialization packet and an identification of the first terminal; and second inserting means to include, upon receiving the confirmation signal by the first transceiver and in the event that the transceiver associated to the reference included in the confirmation signal does not correspond to the first transceiver, a change request in the downstream signal provided by the transceiver associated to the reference, the change request including the identification of the terminal and the first frequency band associated to the first transceiver.

This object is still further achieved by a first terminal for inclusion in a communication access network and adapted to receive information and being a one of a plurality of terminals included in a communication access network, the communication access network including a head-end which includes a plurality of transceivers and which is downstream coupled to each one of the plurality of terminals via a downstream common link and a tree-like distributive network, each one of the plurality of transceivers being adapted to provide one of a plurality of downstream signals, in one of a plurality of frequency bands associated to the one of the plurality of transceivers to a combiner included in the head-end, the combiner being adapted to combine together the plurality of downstream signals into a downstream modulated signal which is broadcasted from the head-end to the plurality of terminals, the first terminal being coupled to a first one of the plurality of transceivers via an upstream link, the information being provided by the head-end to the first terminal and concerns a filter frequency band being a first one of the plurality of frequency bands and being intended to be used by the first terminal to filter out of said modulated signal a first regenerated downstream signal which is associated to a first one of the downstream signals provided by the first transceiver, wherein the first terminal further includes: filter means included to receive the downstream modulated signal and to filter out of the downstream modulated signal with one of the plurality of frequency bands a regenerated downstream signal, and to receive an initialization packet included in the regenerated downstream signal, the initialization packet being one of a plurality of initialization packets, each one of the plurality of initialization packets including a distinct reference and being associated to a respective one of the plurality of transceivers and being included in one of the plurality of downstream signals provided by the one transceiver; and confirmation means adapted: to upstream transmit, upon receiving of the initialization packet, a confirmation signal which includes the reference of the one initialization packet and an identification of the first terminal, in order to thereby enable the head-end, upon receiving the confirmation signal by the first transceiver and in the event that the transceiver associated to the reference included in the confirmation signal does not correspond to the first transceiver, to distribute a change request by including the change request in the downstream signal provided by the transceiver associated to the reference, the change request including the identification of the first terminal and the first frequency band associated to the first transceiver.

A further object of the invention is a communication access network that includes such a terminal and head-end (s).

Indeed, the method of the invention includes the following steps a) the head-end distributes initialization packets, each initialization packet includes a reference and is associated to one of the transceivers and is inserted in the downstream signal which is provided by the associated transceiver.

b) any terminal, e.g. the first terminal which is switched on with the purpose to access the communication access network, filters out of the downstream modulated signal with one of the pre-assigned frequency bands a regenerated downstream signal;

c) the first terminal, upon receiving of such an initialization packet included in the regenerated downstream signal, transmits upstream to its transceiver i.e. the first transceiver, a confirmation signal which includes the reference of the received initialization packet and an identification of the terminal;

d) the head-end, upon receiving of the confirmation signal by the first transceiver of the first terminal and in the event that the first transceiver which is associated to the reference included in the confirmation signal does not correspond to the first transceiver of the first terminal, distributes a change request by including the change request In the downstream signal provided by the transceiver which is associated to the reference, whereby the change request includes the identification of the terminal and the first frequency band which is associated to the first transceiver of the first terminal.

In this way, by using the method of the invention to log on a terminal to the access system, no different installation configuration is needed for different terminals and no prior knowledge is needed for the end-user. Indeed, when using the method of the invention and when a terminal receives a change request of the head-end, the terminal is tuned to the provided filter frequency band which is a correct frequency band to establish a communication between the terminal and its transceiver.

A remark is that step a) and step b) of the invention implicates that the initialization packets are included in the downstream signals and that a terminal, at access time, listens to a frequency band which is e.g. predefined during production or which is chosen at random at the time the terminal is switched on. A possible implementation of these two steps a) and b) is to define a downstream booting frequency band associated to a predefined downstream booting signal provided by a booting transceiver and used for inclusion of at least a plurality of the initialization packets. The downstream booting signal is used by all terminals willing to get access to the communication access network.

A first advantage of such a downstream booting frequency band is that all terminals during production can be performed following one and the same production process which provides a terminal which at access time starts filtering with a frequency band associated to this one predefined downstream signal i.e. the downstream booting channel.

A second advantage of this way of implementation becomes clear with a situation wherein all initialization packets are included in the downstream booting signal and all terminals are listening at start up to the booting frequency band according to this downstream booting signal. In this case, no association of an initialization packet to a transceiver in order to known to which downstream signal a terminal is listening has to be remembered. No memory means have to be implemented in the head-end for this purpose. Indeed, the head-end only has to known which transceiver received a confirmation signal and distributes a change request, included in the downstream booting channel, with the information of the identification of the terminal and the frequency band associated to the transceiver which received the confirmation signal of the terminal.

In addition, an additional implementation is given in order to realize step c) and step d) of the method of the invention. Indeed, the transmission of the upstream confirmation signal can be realized in a predefined upstream frequency band which is also used by each transceiver to receive the confirmation signal.

A further way of implementation with the object to realize the method of the invention as simple as possible is to define the time moment of sending an initialization packet as the reference of that initialization packet.

It has to be explained that two kinds of multiple access are known in the art: a fixed assignment multiple access system whereby a terminal has periodic access to a head-end or a demand-assignment multiple access system whereby a terminal requests access to a head-end by e.g. reacting on a ranging grant which have been sent by his head-end. For both multiple access types some initialization steps have to be executed e.g. distance equalization, power leveling.

In the event of a demand-assignment multiple access system, before performing such above initialization steps, a ranging process has to be performed in order to provide to the head-end the knowledge of the identification of a terminal willing to log on to the access system. As described above, a terminal willing to log on reacts on a ranging grant which is in fact a permission of the head-end for the terminal to sent information.

Such a ranging grant, a reaction packet of a terminal on such a ranging grant and initialization packets exchanged between a head-end and a terminal to realize such above mentioned initialization steps are called hereafter multiple access initialization packets.

This brings us to another characteristic feature of the present invention whereby the initialization packets or the confirmation signal or the change request are integrated in multiple access initialization packets. An advantage of implementing the method of the invention in this way will be explained with the following example. Indeed, by including e.g. an initialization packet of the invention in a ranging grant, the reaction of a terminal to this ranging grant includes anyway the identification of the terminal whereby a number of bits to be transmitted can be saved by including the confirmation signal of the invention in the reaction of the terminal to the ranging grant.

It has to be remarked that once a terminal knows its filter frequency and once a communication between a terminal and its transceiver is established, a downstream and upstream data frequency band can be communicated between each other in order to be used during the transmission of data information.

It has to be explained that associating an initialization packet to a transceiver is giving the possibility to one terminal which is upstream coupled to this transceiver to get access to the access system. In order to give to the terminals coupled to the access communication network a substantial equally chance to get access to the access system, the association of the initialization packets to the transceivers are spread over the plurality of transceivers following a relation which is directly proportional to the number of terminals which are coupled to each one of the plurality of transceivers.

Furthermore, it has to be remarked that in the event that the transceiver associated to the reference included in the confirmation signal corresponds to the transceiver whereto the terminal is coupled, it is not necessary to transmit a change request since the frequency band used by the terminal is already the good one. Indeed a possible implementation of the method of the invention is to confirm in such a situation that the filter frequency band to be used is the frequency band which was already used by the terminal to filter out of the downstream modulated signal a regenerated downstream signal to receive an initialization packet. It has to be remarked that a possible implementation of this feature can be realized by e.g. sending a filter frequency band confirmation signal from the head-end to the terminal or providing at the terminal the knowledge that after passing a predetermined time from executing step c) of the invention without receiving step d) of the invention, the actual used frequency band is assumed to be the good one.

It is further to be noticed that the term "including", used in the claims, should not be interpreted as being limitative to the means listed thereafter. Thus, the scope of the expression "a device including means A and means B" should not be limited to devices consisting only of components A and B. It means that with respect to the present invention, the only relevant components of the devices are A and B.

Similarly, it is to be noticed that the term "coupled", also used in the claims, should not be interpreted as being limitative to direct connection only. Thus, the scope of the expression "a device A coupled to a device B" should not be limited to devices or systems wherein an output of device A is directly connected to an input of device B. It means that there exists a path between an output of A and an input of B which may be a path including other devices or means.

It has to be remarked that the information concerning a filter frequency band can be stored in a memory of a terminal after being provided to this terminal. The following time that the terminal is switched on, it is possible to check first the availability of a good filter frequency band in the memory of the terminal. In the event that such a good filter frequency band is available it is not necessary to execute the method of the invention but the available good filter frequency band can be used immediately to filter out of the modulated signal a regenerated downstream signal associated to a downstream signal and provided by the transceiver of the terminal. Only in the event that a reconfiguration of the access network took place between the time that the filter frequency band was memorized by the terminal and the time that this filter frequency band is re-used by the terminal as a good filter frequency band the steps of the method of the invention will have to be executed.

BRIEF DESCRIPTION OF THE DRAWINGS

The above and other objects and features of the invention will become more apparent and the invention itself will be best understood by referring to the following description of an embodiment taken in conjunction with the accompanying drawing wherein a representation of an access communication network including a head-end and a terminal according to the invention is shown.

BEST MODE OF CARRYING OUT THE INVENTION

Figure 1:
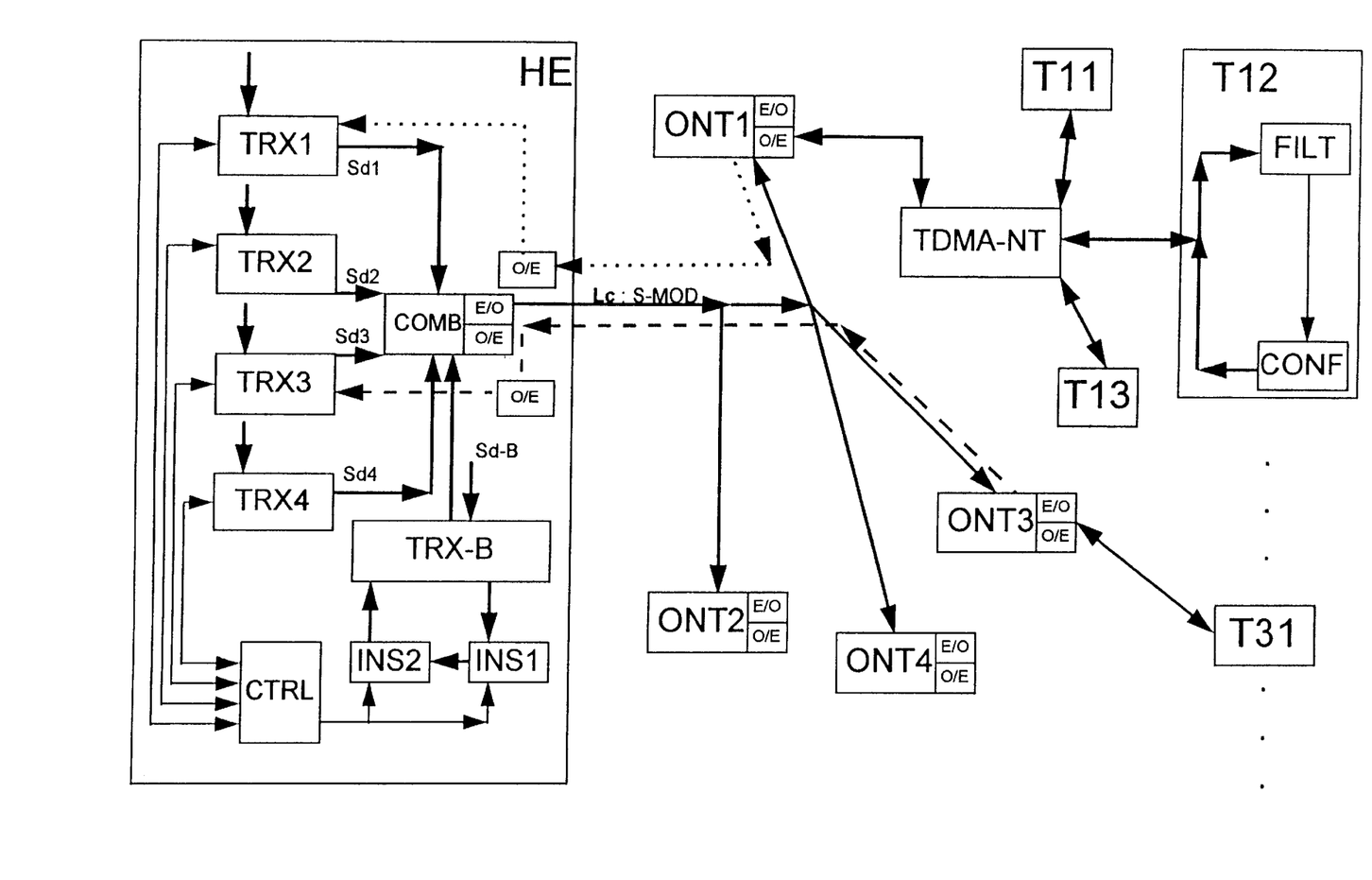

Referring to the FIGURE an access communication network will be described. First, the access communication network will be described by means of a description of the functional blocks included in the access communication network. Based on this description, implementation of the functional blocks in the FIGURE will be obvious to a person skilled in the art and will therefore not be described in detail. In addition the principle working of the method of the invention will be described in further detail.

The access communication network shown in the FIGURE is a hybrid fiber coax network and includes a head-end HE, a plurality of optical network terminators ONT1, ONT2, ONT3 and ONT4, a time division multiple access network terminator TDMA-NT and a plurality of terminals T11, T12, T13, . . . , T31, . . . . In order not to overload the FIGURE only a few terminals are shown i.e. those terminals T11, T12, T13, . . . , T31, . . . which are relevant to describe the principle working of the method of the invention.

First the links and functional blocks related to provide signals in the downstream direction will be explained, later on the upstream communication direction of the communication access network will be explained.

In the downstream direction, the head-end HE is coupled to the plurality of terminals via a downstream common link Lc and a tree-like distributive network. The tree like distributive network is shown in the FIG. with full lines with arrows in the downstream direction i.e. form the head-end HE, via one of the plurality of optical network terminators ONT1, ONT2, ONT3 and via eventual the time division multiple access network terminator TDMA-NT to one of the plurality of terminal s T11, T12, T13, . . . , T31, . . . .

The head-end HE includes a plurality of transceivers TRX1, TRX2, TRX3, TRX4 and TRX-B, a combiner COMB, first inserting means INS1, second inserting means INS2 and a control manager CTRL.

Each transceiver TRX1, TRX2, TRX3, TRX4 and TRX-B receives information of an asynchronous transfer mode ATM coupled to the communication access network of the invention. This means that each transceiver TRX1, TRX2, TRX3, TRX4 and TRX-B is coupled to this network. In order not to overload the FIGURE, the ATM network is not shown, but the different links to this network are shown in the FIGURE with vertical arrows ending at the different transceiver TRX1, TRX2, TRX3, TRX4 and TRX-B. Each transceiver TRX1, TRX2, TRX3, TRX4 and TRX-B is coupled to the combiner COMB which is coupled to the downstream common link Lc.

The combiner COMB receives the information coming from the ATM network via the different transceivers TRX1, TRX2, TRX3, TRX4 and TRX-B in different frequency bands CH1, CH2, CH3, CH4 and CH-B, respectively. This means that each transceiver TRX1, TRX2, TRX3, TRX4 and TRX-B has its associated frequency band CH1, CH2, CH3, CH4 and CH-B. By this way, the combiner receives a plurality of downstream signals Sd1, Sd2, Sd3, Sd4 and Sd-B each one, being provided in a different frequency band CH1, CH2, CH3, CH4 and CH-B. The combiner combines the received downstream signals Sd1, Sd2, Sd3, Sd4 and Sd-B together in one downstream modulated signal S-MOD which is downstream broadcasted in the access communication network via the downstream link Lc and the tree-like distributive network to the different terminals T11, T12, T13, . . . , T31, . . . .

It has to be remarked that distribution of the downstream modulated signal S-MOD goes over different physical mediums i.e. electrical and optical. Indeed the downstream modulated signal S-MOD is converted from an electrical signal into an optical signal in the combiner COMB just before leaving the head-end HE and is transmitted over optical fibers to the different optical network terminators ONT1, ONT2, ONT3 and ONT4. In the optical network terminators ONT1, ONT2, ONT3 and ONT4 the optical signal is again converted into an electrical signal being the downstream modulated signal S-MOD. From the optical network terminators ONT1, ONT2, ONT3 and ONT4 the downstream modulated signal S-MOD is further distributed over coaxial cables towards the different terminal s T11, T12, T13, . . . , T31, . . . .

It has to be remarked that all the terminals e.g. T11, T12 and T13 which are coupled to one and the same optical network terminator ONT1 belong to the same domain, called hereafter a MAC domain, of this optical network terminator ONT1.

It has to be remarked that an embodiment is preferred with only one predefined downstream signal to include all the downstream initialization packets and the possible change requests. This means that one of the plurality of transceivers TRX-B is a booting transceiver which provides its downstream signal Sd-B, called hereafter downstream booting signal, to the combiner COMB in the frequency band CH-B, called hereafter booting frequency band. The first inserting means INS1 and the second inserting means INS2 are both coupled to this booting transceiver TRX-B.

The first inserting means INS1 includes at predefined time moments . . . , Tu, Tv, Tw, Tx, Ty, Tz, . . . initialization packets . . . , Tu-TRX3, Tv-TRX4, Tw-TRX-B, Tx-TRX1, Ty-TRX2, Tz-TRX3, . . . in the downstream booting signal Sd-B. Each one of the initialization packets Tu-TRX3, Tv-TRX4, Tw-TRX-B, Tx-TRX1, Ty-TRX2, Tz-TRX3 includes a reference . . . , Tu, Tv, Tw, Tx, Ty, Tz, . . . and is associated to one of the plurality of transceivers TRX1, TRX2, TRX3, TRX4 and TRX-B. In this particular embodiment the predefined time moment of insertion . . . , Tu, Tv, Tw, Tx, Ty, Tz, . . . are defined under control of the control manager CTRL and the references . . . , Tu, Tv, Tw, Tx, Ty, Tz, . . . of the initialization packets Tu-TRX3, Tv-TRX4, Tw-TRX-B, Tx-TRX1, Ty-TRX2, Tz-TRX3 are determined by the predefined time moments . . . , Tu, Tv, Tw, Tx, Ty, Tz, . . . .

It has to be remarked that due to the downstream booting signal Sd-B, no memory means have to be provided to keep track of the association of the initialization packets Tu-TRX3, Tv-TRX4, Tw-TRX-B, Tx-TRX1, Ty-TRX2, Tz-TRX3 to the transceivers TRX1, TRX2, TRX3, TRX4 and TRX-B in order to know via which downstream signal an initialization packet have been sent.

The second inserting means INS2 includes, also under control of the control manager CTRL, a change request e.g. REQ(CH1;T12) in the downstream booting signal Sd-B of the booting transceiver TRX-B. Such a change request e.g. REQ(CH1;T12) includes the identification of a terminal e.g. T12 and a frequency band e.g. CH1. This will be further explained in a further paragraph.

In the FIGURE it is shown that the downstream signal Sd-B of the booting transceiver TRX-B is provided from the booting transceiver TRX-B via the first inserting means INS1 to the second inserting means INS2 and back to the booting transceiver TRX-B. It has to be remarked that the first inserting means INS1 and the second inserting means INS are inserting in the downstream booting signal Sd-B the packets which they have to insert at the time moments whenever they have to insert under the control of the control manager CTRL, but at time moments when one of both inserting means INS1 or INS2 doesn't have to include a packet, the downstream booting signal Sd-B is just passing through the involved inserting means INS1 or INS2.

The other transceivers TRX1, TRX2, TRX3 and TRX4 are connected to the control manager CTRL in order to exchange control signals. The contents of these control signals will be explained in a further paragraph.

A terminal e.g. T12 of the plurality of terminals . . . , T11, T12, T13, . . . , T31, . . . includes filter means FILT and confirmation means CONF. In order not to overload the FIGURE only for terminal T12 the filter means FILT and confirmation means CONF are shown. It has to be remarked that these functional blocks are available in all the other terminals and that the following description of the working of the functional blocks is also valid for the other terminals.

The filter means FILT is coupled to one of the end-points of the coaxial cables of the tree-like distributive network. Upon receiving of the downstream modulated signal S-MOD by the terminal T12 a downstream regenerated signal is filtered out of the downstream modulated signal S-MOD.

Since, in this particular embodiment, a downstream booting channel is implemented, all terminals are tuned to listen to the some downstream booting frequency channel CH-B. This means that all terminals are configured in a way that at initialization time, when a terminal wants to get access to the system, it filters out of the downstream modulated signal S-MOD with the same booting frequency band CH-B the same downstream booting signal Sd-B.

The filter means FILT is coupled to the confirmation means CONF in order to provide a control signal whereof the content will be described later on. The confirmation means CONF are again coupled to the end-points of the coaxial cables in order to provide an upstream signal.

The communication access network with its links and signals in the upstream direction will be described in the following paragraph.

The different upstream signals of the different terminals of one MAC domain are time division multiplexed in a time division multiple access network terminator as shown in the FIGURE. In order not to overload the FIGURE, only one time division multiple access network terminator TDMA-NT is shown. A time multiplexed electrical signal is provided from the time division multiple access network terminator TDMA-NT to the optical network terminator ONT1. The optical network terminator converts this time multiplexed electrical signal to a time multiplexed optical signal.

Each optical network terminator e.g. ONT1 is upstream coupled with an optical fiber to a transceiver TRX1 of the head-end. This means that each optical network terminator has its own upstream link to its own transceiver. In order not to overload the FIGURE only two upstream links are shown: one upstream link, shown with a dotted line, from the optical network terminator ONT1 to the transceiver TRX1 and one upstream link, shown with a dashed line, from the optical network terminator ONT3 to the transceiver TRX3.

Also in order to transmit the upstream packets of the invention a predefined upstream booting channel is preferred: CHu-B. This means that all terminals are using the same upstream frequency band CHu-B in order to transmit the packets of the invention and that all transceivers are using this same frequency band CHu-B to receive these packet. Since in the upstream direction for one MAC domain, time division multiple access is used and for different MAC domains different upstream links are used, no contamination of packets coming from different terminals will occur.

The time multiplexed optical signal is, once arrived in the head-end HE, again converted into a time multiplexed electrical signal and provided to its transceiver. Only the two optical to electrical converters O/E according to the shown upstream links are shown in the FIGURE.

In the following paragraph the principle working of the method of the invention will be described in further detail on the basis of an example.

Presume a situation that terminal T12 and terminal T31 are willing to get access to the communication access system.

In the meantime, the control manager CTRL gives by means of a control signal to the first inserting means INS1 the instruction to insert, at time moment Tu, in the downstream booting signal Sd-B the initialization packet Tu-TRX-B. This initialization packet Tu-TRX-B is associated to transceiver TRX-B and has the reference of the time moment of insertion i.e. Tu. The downstream booting signal Sd-B is modulated together with the other downstream signals in the combiner COMB and is distributed to all terminals ..., T11, T12, T13, ..., T31, ... of the communication access network. Both terminals T12 and T31 are receiving the modulated downstream signal S-MOD in their Filter means FILT and are filtering out of the received downstream modulated signal S-MOD with the same booting frequency band CH-B the regenerated downstream signal Sdr-B. In the downstream signal Sdr-B, both terminals T12 and T31, are receiving the initialization pocket Tu-TRX-B.

Since both terminals are willing to log on to the access system, they will both create an instruction for their confirmation means CONF in order to create a confirmation signal with the content of the reference Tu of the received initialization packet and its own identification:

terminal T12 creates a confirmation signal C(Tu-T12) which includes the reference Tu of the initialization packet Tu-TRX-B and an identification of its own T12;

terminal T31 creates a confirmation signal C(Tu-T31) which includes the reference Tu of the initialization packet Tu-TRX-B and an identification of its own T31.

Both confirmation signals C(Tu-T12) and C(Tu-T31) are upstream transmitted:

confirmation signal C(Tu-T12) is upstream transmitted via the time division multiple access terminator TDMA-NT and via its optical network terminator ONT1 and its optical upstream link to its transceiver TRX11;

confirmation signal C(Tu-T31) is upstream transmitted via its optical network terminator ONT3 and its optical upstream link to its transceiver TRX3.

Upon receiving of these confirmation signals, both transceivers TRX1 and TRX3 are providing to the control manager CTRL a control confirmation signal including the contents of the received confirmation signal.

The control manager CTRL knows from which transceiver it received the control confirmation signal and knows that the terminals which initialized the confirmation signal are listening anyway to the downstream booting signal i.e. a different downstream signal then the downstream signal associated to the transceivers which received the confirmation signals.

The result of this knowledge is that the control manager CTRL provides two change request control signals to the second inserting means INS2 whereby the second inserting means INS2 includes two change request signals in the downstream booting signal:

a first change request REQ(CH1;T12) includes the frequency band CH1 associated to the first transceiver TRX1 which received the confirmation signal C(Tu-T12) and the identification of the terminal included in this confirmation signal C(Tu-T12);

a second change request REQ(CH3;T31) includes the frequency band CH3 associated to the first transceiver TRX3 which received the confirmation signal C(Tu-T31) and the identification of the terminal included in this confirmation signal C(Tu-T31).

Both change requests are distributed in the communication access network. Upon recognition of its own identification, both terminals will change to the requested frequency band in order to receive the downstream signal of its own transceiver:

terminal T12 tunes it filter frequency to CH1 and receives the downstream signal Sd1 coming from its transceiver TRX1 whereby a further initialization process e.g. delay ranging and power ranging between the transceiver TRX1 and the terminal T12 can be executed;

terminal T31 tunes it filter frequency to CH3 and receives the downstream signal Sd3 coming from its transceiver TRX3 whereby a further initialization process e.g. delay ranging and power ranging between the transceiver TRX3 and the terminal T31 can be executed.

It has to be remarked that the application of the invention is not limited to a hybrid fiber coax communication network as described in the chosen embodiment of the invention. Small modifications, evident to a person skilled in the art, may be applied to the above described embodiment to adapt it to be integrated in other networks wherein information concerning a to be used frequency band has to be provided from a head-end to a terminal. Indeed, in distributive interactive telecommunication networks with the minimum features as the topology of the network described in the introductory part, the present invention is applicable.

While the principles of the invention have been described above in connection with specific apparatus, it is to be clearly understood that this description is made only by way of example and not as a limitation on the scope of the invention, as defined in the appended claims.

What is claimed is:

1. A method for use in a communication access network, said communication access network including a plurality of terminals (T11, T12, T13, ..., T31, ... ) and a head-end (HE) which includes a plurality of transceivers (TRX1, TRX2, TRX3, ... ), said head-end (HE) being downstream coupled to each one of said plurality of terminals (T11, T12, T13, ..., T31) via a downstream common link (Lc) and a tree-like distributive network, each one of said plurality of transceivers (TRX1, TRX2, TRX3, ... ) providing one of a plurality of downstream signals (Sd1, Sd2, Sd3, ... ), in one of a plurality of frequency bands (CH1, CH2, CH3, ... ) associated to said one of said plurality of transceivers (RX1, TRX2, TRX3, ... ) to a combiner (COMB) included in said head-end (HE), said plurality of downstream signals (Sd1, Sd2, Sd3, ... ) being together combined (COMB) into a downstream modulated signal (S-MOD), said downstream modulated signal (S-MOD) being broadcasted from said head-end (HE) to said plurality of terminals (T11, T12, T13, ..., T31, ... ), a first one (T12) of said plurality of terminals being upstream coupled to a first one (TRX1) of said plurality of transceivers via an upstream link (Lu12), the aim of said method being to provide information to said first terminal (T12), said information concerning a filter frequency band (CH1) being a first one of said plurality of frequency bands (CH1, CH2,CH3, . . . ) and being intended to be used by said first terminal (T12) to filter out of said downstream modulated signal (S-MOD) a first regenerated downstream signal (Sdr1) associated to a first one (Sd1) of said downstream signals provided by said first transceiver (TRX1), and characterized in that said method includes the steps of:

a) at predefined time moments (Tx, Ty, Tz, . . . ) distributing by said head-end (HE) initialization packets (Tx-TRX1, Ty-TRX2, Tz-TRX3, . . . ), each one (Tz-TRX3) of said initialization packets including a distinct reference (Tz) and being associated to a respective one of said plurality of transceivers (TRX3) and being included in one (Sd3) of said plurality of downstream signals provided by said one transceiver (TRX3);

b) said first terminal (T12), upon receiving said downstream modulated signal (S-MOD), filtering out of said downstream modulated signal (S-MOD) with one of said plurality of frequency bands (CH3) a regenerated downstream signal (Sdr3);

c) said first terminal (T12), upon receiving one of said initialization packets (Tz-TRX3) included in said regenerated downstream signal (Sdr3), upstream transmitting a confirmation signal (C(Tz;T12)) which includes said reference (Tz) of said one initialization packet (Tz-TRX3) and an identification of said first terminal (T12); and     d) said head-end (HE), upon receiving said confirmation signal (C(Tz;T12)) by said first transceiver (TRX1) and in the event that the transceiver (TRX3) associated to said reference (Tz) does not correspond to said first transceiver (TRX1), distributing a change request (REQ(CH1;T12)) by including said change request (REQ(CH1;T12)) in the downstream signal (Sd3) provided by the transceiver (TRX3) associated to said reference (Tz), said change request (REQ(CH1;T12)) including said identification of said first terminal (T12) and said first frequency band (CH1) associated to said first transceiver (TRX1).

2. The method for use in a communication access network according to claim 1, characterized in that said step a) is realized by including at least a plurality of said initialization packets in a predefined downstream signal (Sd-B) being one of said plurality of downstream signals and being provided by a predefined transceiver (TRX-B) being one of said plurality of transceivers and whereby in step b) said one of said plurality of frequency bands equals the frequency band (CH-B) of said plurality of frequency bands wherein said predefined downstream signal (Sd-B) is provided to said combiner (COMB).

3. The method for use in a communication access network according to claim 1, characterized in that said upstream transmitting of a confirmation signal (C(Tz;T12)) of said step c) is realized in a predefined upstream frequency band and whereby said receiving of said confirmation signal (C(Tz;T12)) of said step d) is realized in said predefined upstream frequency band.

4. The method for use in a communication access network according to claim 1, characterized in that said references of said initialization packets (Tx-TRX1, Ty-TRX2, Tz-TRX3, . . . ) are constituted by said predefined time moments (Tx, Ty, Tz, . . . ).

5. The method for use in a communication access network according to claim 1, characterized in that one of said initialization packets (Tx-TRX1, TyTRX2, Tz-TRX3, . . . ) or said confirmation signal (C(Tz;T12)) or said change request (REQ(CH1;T12) are included in multiple access initialization packets.

6. The method for use in a communication access network according to claim 1, characterized in that said association of each one of said initialization packets (Tx-TRX1, Ty-TRX2, Tz-TRX3, . . . ) to one of said plurality of transceivers (TRX1, TRX2, TRX3, . . . ) is performed following a relation directly proportional to the number of terminals out of said plurality of terminals (T11, T12, T13, . . . , T31, . . . ) which are upstream coupled to each one of the plurality of transceivers (TRX1, TRX2, TRX3, . . . ).

7. The method for use in a communication access network according to claim 1, characterized in that said method further includes the step of:

e) upon receiving of said confirmation signal (C(Tz;T12)) by said first transceiver (TRX1) and in the event that the transceiver (TRX3) associated to said reference (Tz) corresponds to said first transceiver (TRX1), confirming that said filter frequency band being said first frequency band (CH1) is constituted by said frequency band (CH3) used in said step b) to filter out of said downstream modulated signal (S-MOD) a regenerated downstream signal (Sdr3).

8. A head-end (HE) for inclusion in a communication access network and adapted to provide information, said head-end (HE) including a plurality of transceivers (TRX1, TRX2, TRX3, . . . ) and being downstream coupled to each one of a plurality of terminals (T11, T12, T13, . . . , T31, . . . ) included in said communication access network via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ) in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine said plurality of downstream signals (Sd1, Sd2, Sd3, . . . ) together into a downstream modulated signal (S-MOD) which is broadcasted from said head-end (HE) to said plurality of terminals (T11, T12, T13, . . . , T31, . . . ), a first one (T12) of said plurality of terminals being coupled to a first one (TRX1) of said plurality of transceivers via an upstream link (Lu12), said information being provided to said first terminal (T12) and concerning a filter frequency band being a first one (CH1) of said plurality of frequency bands (CH1, CH2, CH3, . . . ) and being intended to be used by said first terminal (T12) to filter out of said downstream modulated signal (S-MOD) a first regenerated downstream signal (Sdr1) being associated to a first one (Sd1) of said downstream signals provided by said first transceiver (TRX1), characterized in that said head-end (HE) further includes:

first inserting means (INS1) to include at predefined time moments (Tx, Ty, Tz, . . . ) initialization packets (Tx-TRX1, Ty-TRX2, Tz-TRX3, . . . ), each one (Tz-TRX3) of said initialization packets including a distinct reference (Tz) and being associated to a respective one (TRX3) of said plurality of transceivers (TRX1, TRX2, TRX3, . . . ) and is included in one (Sd3) of said plurality of downstream signals (Sd1, Sd2, Sd3, . . . provided by said one transceiver (TRX3), said first inserting means (INS1) enables thereby said first terminal (T12) to receive one of said initialization packets (Tz-TRX3) included in a regenerated downstream signal (Sdr3) which is filtered out of said
downstream modulated signal (S-MOD) received by
said first terminal (T12) with one of said plurality of
frequency bands (CH3) and to transmit an upstream
confirmation signal (C(Tz;T12)) which includes said
reference (Tz) of said one initialization packet (Tz-
TRX3) and an identification of said first terminal (T12);
and second inserting means (INS2) to include, upon receiving
said confirmation signal (C(Tz;T12)) by said first transceiver (TRX1) and in the event that the transceiver
(TRX3) associated to said reference (Tz) included in
said confirmation signal (C(Tz;T12) does not correspond to said first transceiver (TRX1), a change request
(REQ(CH1;T12)) in the downstream signal (Sd3) provided by the transceiver (TRX3) associated to said
reference (Tz), said change request (REQ(CH1;T12))
including said identification of said terminal (T12) and
said first frequency band (CH1) associated to said first
transceiver (TRX1).

9. A first terminal (T12) for inclusion in a communication
access network and adapted to receive information and
being a one of a plurality of terminals (T1, T12, T13, ... ,
T31, ... ) included in a communication access network, said
communication access network including a head-end (HE)
which includes a plurality of transceivers (TRX1, TRX2,
TRX3, ... ) and which is downstream coupled to each one
of said plurality of terminals (T11, T12, T13, ... , T31, ... )
via a downstream common link (Lc) and a tree-like distributive network, each one of said plurality of transceivers
(TRX1, TRX2, TRX3, ... ) being adapted to provide one of
a plurality of downstream signals (Sd1, Sd2, Sd3, ... ), in
one of a plurality of frequency bands (CH1, CH2, CH3, ... )
associated to said one of said plurality of transceivers
(TRX1, TRX2, TRX3, ... ) to a combiner (COMB) included
in said head-end (HE), said combiner (COMB) being
adapted to combine together said plurality of downstream
signals (Sd1, Sd2, Sd3, ... ) into a downstream modulated
signal (S-MOD) which is broadcasted from said head-end
(HE) to said plurality of terminals (T11, T12, T13, ... , T
31. ... ), said first terminal (T12) being coupled to a first one
(TRX1) of said plurality of transceivers via an upstream link
(Lu12), said information being provided by said head-end
(HE) to said first terminal (T12) and concerns a filter
frequency band (CH1) being a first one of said plurality of
frequency bands (CH1, CH2, CH3, ... ) and being intended
to be used by said first terminal (T12) to filter out of said
modulated signal (S-MOD) a first regenerated downstream
signal (Sdr1) which is associated to a first one (Sd1) of said
downstream signals provided by said first transceiver
(TRX1), characterized in that said first terminal (T12) further includes:

a) filter means (FILT) included:
  to receive said downstream modulated signal
    (S-MOD);
  to filter out of said downstream modulated signal
    (S-MOD) with one of said plurality of frequency
    bands (CH3) a regenerated downstream signal
    (Sdr3); and
  to receive an initialization packet (Tz-TRX3) included
    in said regenerated downstream signal (Sd3), said
    initialization packet being (Tz-TRX3) one of a plurality of initialization packets (Tx-TRX1, Ty-TRX2,
    Tz-TRX3, . . . ), each one (Tz-TRX3) of said
    plurality of initialization packets (Tx-TRX1,
    Ty-TRX2, Tz-TRX3, . . . ) including a distinct
    reference (Tz) and being associated to a respective
    one (TRX3) of said plurality of transceivers (TRX1,
    TRX2, TRX3, ... ) and being included in one (Sd3)
    of said plurality of downstream signals (Sd1, Sd2,
    Sd3, ... ) provided by said one transceiver (TRX3);
    and b) confirmation means (CONF) adapted:
  to upstream transmit, upon receiving said initialization
    packet (Tz-TRX3), a confirmation signal
    (C(Tz;T12)) which includes said reference (Tz) of
    said one initialization packet (Tz-TRX3) and an
    identification of said first terminal (T12), in order to
    thereby enable said head-end (HE), upon receiving
    of said confirmation signal (C(Tz;T12)) by said first
    transceiver (TRX1) and in the event that the transceiver (TRX3) associated to said reference (Tz)
    included in said confirmation signal (C(Tz;T12))
    does not correspond to said first transceiver (TRX1),
    to distribute a change request (REQ(CH1;T12)) by
    including said change request (REQ(CH1;T12)) in
    the downstream signal (Sd3) provided by the transceiver (TRX3) associated to said reference (Tz), said
    change request (REQ(CH1;T12)) including said
    identification of said first terminal (T12) and said
    first frequency band (CH1) associated to said first
    transceiver (TRX1).

10. A communication access network characterized in that
said communication access network includes at least one
terminal (T12) for inclusion in a communication access
network and adapted to receive information and being a one
of a plurality of terminals (T11, T12, T13, ... , T31, ... )
included in a communication access network, said communication access network including a head-end (HE) which
includes a plurality of transceivers (TRX1, TRX2,
TRX3, ... ) and which is downstream coupled to each one
of said plurality of terminals (T11, T12, T13, T31, ... ) via
a downstream common link (Lc) and a tree-like distributive
network, each one of said plurality of transceivers (TRX1,
TRX2, TRX3, . . . ) being adapted to provide one of a
plurality of downstream signals (Sd1, Sd2, Sd3, ... ), in one
of a plurality of frequency bands (CH1, CH2, CH3, ... )
associated to said one of said plurality of transceivers
(TRX1, TRX2, TRX3, ... ) to a combiner (COMB) included
in said head-end (HE), said combiner (COMB) being
adapted to combine together said plurality of downstream
signals (Sd1, Sd2, Sd3, ... ) into a downstream modulated
signal (S-MOD) which is broadcasted from said head-end
(HE) to said plurality of terminals (T11, T12, T13, ... , T31.
. . . ), said first terminal (T12) being coupled to a first one
(TRX1) of said plurality of transceivers via an upstream link
(Lu12), said information being provided by said head-end
(HE) to said first terminal (T12) and concerns a filter
frequency band (CH1) being a first one of said plurality of
frequency bands (CH1, CH2, CH3, ... ) and being intended
to be used by said first terminal (T12) to filter out of said
modulated signal (S-MOD) a first regenerated downstream
signal (Sdr1) which is associated to a first one (Sd1) of said
downstream signals provided by said first transceiver
(TRX1), characterized in that said first terminal (T12) further includes:

a) filter means (FILT) included:
  to receive said downstream modulated signal
    (S-MOD);
  to filter out of said downstream modulated signal
    (S-MOD) with one of said plurality of frequency
    bands (CH3) a regenerated downstream signal
    (Sdr3); and
  to receive an initialization packet (Tz-TRX3) included
    in said regenerated downstream signal (Sd3), said initialization packet being (Tz-TRX3) one of a plurality of initialization packets (Tx-TRX1, Ty-TRX2, Tz-TRX3, . . . ), each one (Tz-TRX3) of said plurality of initialization packets (Tx-TRX1, Ty-TRX2, Tz-TRX3, . . . ) including a distinct reference (Tz) and being associated to a respective one (TRX3) of said plurality of transceivers (TRX1, TRX2, TRX3, . . . ) and being included in one (Sd3) of said plurality of downstream signals (Sd1, Sd2, Sd3, . . . ) provided by said one transceiver (TRX3); and b) confirmation means (CONF) adapted:
to upstream transmit, upon receiving said initialization packet (Tz-TRX3), a confirmation signal (C(Tz;T12)) which includes said reference (Tz) of said one initialization packet (Tz-TRX3) and an identification of said first terminal (T12), in order to thereby enable said head-end (HE), upon receiving of said confirmation signal (C(Tz;T12)) by said first transceiver (TRX1) and in the event that the transceiver (TRX3) associated to said reference (Tz) included in said confirmation signal (C(Tz;T12)) does not correspond to said first transceiver (TRX1), to distribute a change request (REQ(CH1;T12)) by including said change request (REQ(CH1;T12)) in the downstream signal (Sd3) provided by the transceiver (TRX3) associated to said reference (Tz), said change request (REQ(CH1;T12)) including said identification of said first terminal (T12) and said first frequency band (CH1) associated to said first transceiver (TRX1) or at least one head-end (HE) for inclusion in a communication access network and adapted to provide information, said head-end (HE) including a plurality of transceivers (TRX1, TRX2, TRX3, . . . ) and being downstream coupled to each one of a plurality of terminals (T11, T12, T13, . . . , T31, . . . ) included in said communication access network via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ) in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine said plurality of downstream signals (Sd1, Sd2, Sd3, . . . ) together into a downstream modulated signal (S-MOD) which is broadcasted from said head-end (HE) to said plurality of terminals (T1, T12, T13, . . . , T31, . . . ), a first one (T12) of said plurality of terminals being coupled to a first one (TRX1) of said plurality of transceivers via an upstream link (Lu12), said information being provided to said first terminal (T12) and concerning a filter frequency band being a first one (CH1) of said plurality of frequency bands (CH1, CH2, CH3, . . . ) and being intended to be used by said first terminal (T12) to filter out of said downstream modulated signal (S-MOD) a first regenerated downstream signal (Sdr1) being associated to a first one (Sd1) of said downstream signals provided by said first transceiver (TRX1), characterized in that said head-end (HE) further includes:

first inserting means (INS1) to include at predefined time moments (Tx, Ty, Tz, . . . ) initialization packets (Tx-TRX1, Ty-TRX2, Tz-TRX3, . . . ), each one (Tz-TRX3) of said initialization packets including a distinct reference (Tz) and being associated to a respective one (TRX3) of said plurality of transceivers (TRX1, TRX2, TRX3, . . . ) and is included in one (Sd3) of said plurality of downstream signals (Sd1, Sd2, Sd3, . . . ) provided by said one transceiver (TRX3), said first inserting means (INS1) enables thereby said first terminal (T12) to receive one of said initialization packets (Tz-TRX3) included in a regenerated downstream signal (Sdr3) which is filtered out of said downstream modulated signal (S-MOD) received by said first terminal (T12) with one of said plurality of frequency bands (CH3) and to transmit an upstream confirmation signal (C(Tz;T12)) which includes said reference (Tz) of said one initialization packet (Tz-TRX3) and an identification of said first terminal (T12); and second inserting means (INS2) to include, upon receiving said confirmation signal (C(Tz;T12)) by said first transceiver (TRX1) and in the event that the transceiver (TRX3) associated to said reference (Tz) included in said confirmation signal (C(Tz;T12) does not correspond to said first transceiver (TRX1), a chance request (REQ (CH1;T12)) in the downstream signal (Sd3) provided by the transceiver (TRX3) associated to said reference (Tz), said change request (REQ (CH1;T12)) including said identification of said terminal (T12) and said first frequency band (CH1) associated to said first transceiver (TRX1).

\* \* \* \* \*

UNITED STATES PATENT AND TRADEMARK OFFICE
CERTIFICATE OF CORRECTION

PATENT NO. : 6,359,907 B1
DATED : March 19, 2002
INVENTOR(S) : Robert Peter Christina Wolters and Harry Franciscus Ludovica Vanhoof It is certified that error appears in the above-identified patent and that said Letters Patent is hereby corrected as shown below:

Column 14,
Line 64, after "Sd3,..." insert -- ) --.

Column 15,
Line 23, "T1" should be -- T11 --

Column 16,
Line 34, after "T13," insert -- ..., --.

Signed and Sealed this

Tenth Day of December, 2002

JAMES E. ROGAN
*Director of the United States Patent and Trademark Office*